United States Patent [19]
Maurer et al.

[11] Patent Number: 5,218,068
[45] Date of Patent: Jun. 8, 1993

[54] INTRINSICALLY LOW BIREFRINGENT MOLDING POLYMERS AND OPTICAL STORAGE DISKS THEREFROM

[75] Inventors: Brian R. Maurer; Mitchell G. Dibbs, both of Midland, Mich.

[73] Assignee: The Dow Chemical Company, Midland, Mich.

[21] Appl. No.: 890,337

[22] Filed: May 26, 1992

Related U.S. Application Data

[63] Continuation of Ser. No. 587,895, Sep. 25, 1990, abandoned, which is a continuation-in-part of Ser. No. 440,421, Nov. 20, 1989, abandoned, which is a continuation of Ser. No. 173,688, Mar. 25, 1988, abandoned.

[51] Int. Cl.$^5$ .............................................. C08F 22/40
[52] U.S. Cl. .................................. 526/262; 526/307.7; 525/326.8; 525/327.6; 525/329.9; 525/330.5
[58] Field of Search ............................. 526/262, 307.7; 525/326.8, 327.6, 329.9, 330.5

[56] References Cited

FOREIGN PATENT DOCUMENTS

| | | | |
|---|---|---|---|
| 76691 | 4/1983 | European Pat. Off. | 525/330.5 |
| 273092 | 5/1988 | European Pat. Off. | |
| 0233106A | 8/1985 | Japan | 525/330.5 |
| 926269 | 5/1963 | United Kingdom | 525/327.6 |

OTHER PUBLICATIONS

Japan Kokai 85-233106, *Optical Disc Materials*, English Translation, pp. 1-10.

*Primary Examiner*—Joseph L. Schofer
*Assistant Examiner*—Alex H. Walker

[57] ABSTRACT

Intrinsically low birefringent molding polymers having a molten stress optic coefficient that is greater than or equal to $-1000$ Brewsters and less than or equal to $+1000$ Brewsters, a glass transition temperature of at least 140° C., and a water absorption ($A_{H_2O}$) according to ASTM D570-81 after 24 hours immersion in water at 23° C. of less than 0.25 percent comprising in polymerized form at least one structural component providing a positive melt homopolymer stress optic coefficient and at least one other structural component providing a negative melt homopolymer stress optic coefficient.

9 Claims, 10 Drawing Sheets

INTRINSICALLY LOW BIREFRINGENT MOLDING POLYMERS AND OPTICAL STORAGE DISKS THEREFROM

CROSS-REFERENCE TO RELATED APPLICATION

This is a continuation of application Ser. No. 07/587,895, filed Sep. 25, 1990, now abandoned, which is a continuation-in-part of application Ser. No. 440,421, filed Nov. 20, 1989, now abandoned, which is a continuation of Ser. No. 173,688, filed Mar. 25, 1988, now abandoned.

BACKGROUND OF THE INVENTION

The present invention relates to polymers having very low birefringence and other properties making such polymers ideally suited for use in the substrates of optical storage disks and in other applications where good optical properties are desired. Optical storage disks such as compact disks, and more particularly, data storage disks having the ability to both record and playback digitalized data are currently of high commercial interest. Current designs generally employ a disk shaped substrate having good optical transmission properties and one or more layers deposited on at least one major surface of such disk for the inscription of digitalized information. The relatively simplistic compact disk is an example of a read-only optical storage disk. Generally such disks comprise only a reflective layer and a substrate wherein the desired information is encoded in a series of pits formed into the substrate by use of any suitable technique. More advanced designs adapted for both recording and playback of such data and even erasure and rerecording of such data may interpose one or more additional layers between the substrate and reflective layer, one of which is referred to as an active layer. Active layers are comprised of materials that permit data recording. Suitable materials include temperature sensitive photoactive materials, amorphous crystals, magnetically activated optical materials (magneto-optic materials) or other suitable compositions. In particular regard to magneto-optic active layers, a plane polarized laser beam utilized to abstract data from the optical disk is caused to be rotated by passing through the active layer. An optical sensing device such as a light sensitive diode is positioned to intercept the light beam and determine whether rotation has occurred. Rotation of the light beam by the active layer results in a null output signifying a zero. If the laser beam is unaffected by the active layer, the diode is adapted to sense the light thereby signifying a one. As the laser beam scans the surface of the disk a series of zeros and ones is recorded corresponding to the data inscribed in the active layer.

In the preparation of optical disks employing the above described magneto-optic active layer, a thermoplastic substrate is desirably employed. Such substrates may suitably be prepared by injection molding. A number of physical constraints must be satisfied by the polymeric material employed in the preparation of such substrates. Of course, the substrate must be optically transparent at the wavelength employed by the laser sensing means. In addition to being optically transparent, such substrate must not rotate the plane polarized laser beam in a manner that would result in obscuration of the desired output signal.

In other optical uses a low birefringent molding polymer is equally desirable. In such applications as glazing, or in the preparation of automobile interior instrument panel covers, the use of birefringent polymers may be undesirable due to the colored diffraction patterns that may appear under certain lighting conditions.

It is known that polymer anisotropy resulting in birefringence or light interference may result from stress that occurs during the molding of thermoplastic objects. To a certain extent this birefringence may be reduced by the use of molding techniques designed to achieve articles having little or no molded-in stress. These techniques include the use of low molecular weight polymers, high molding temperatures and increased molding times to promote polymer relaxation and the use of molds having large, unimpeded gates and channels to reduce the birefringence of the resulting molded object. Disadvantageously, such techniques increase the time required for molding disk substrates and ultimately increase molding costs.

It is previously known in the art that a material having low birefringence may be prepared by blending appropriate amounts of polymers having opposite birefringent properties. A blend comprising 82 percent polymethyl methacrylate and 18 percent polyvinylidene fluoride is disclosed in *Polymer* 26, 1619 (1985). Other blends having similar properties are disclosed in J. Hennig, *Kunststoffe*, 75, 425 (1985), U.S. Pat. No. 4,373,065, and CA 106 (2):11130A.

Disadvantageously, techniques utilizing polymer blending to achieve low birefringent materials require that the various components be completely miscible and that intimate blending techniques such as solution blending be employed to insure that no domains greater than the wavelength of light result. Large domain size could produce differing levels of birefringence in separate regions of the polymer. Furthermore, it has been discovered that a temperature/strain rate dependence can exist for such blends due to the fact that the two polymers may have independent relaxation rates. That is, if an object formed from such a blend is heated to a temperature above the glass transition temperature of less than all of the components of the blend, stress induced birefringence may reappear.

In addition to inherently low birefringence, a suitable polymer material for use in optical applications should also possess low thermal conductivity, low moisture absorption, excellent durability, and resistance to the effects of high heat. In particular, a desirable substrate material should exhibit a glass transition temperature high enough that techniques for deposition of a reflective layer such as metal sputtering or metal vapor disposition or other exposures to high temperatures do not affect the material. Also, for optical recording disks, low moisture absorption is desired such that differential expansion of the disk not occur and that interaction of water vapor with other components of the disk, especially either the active layer or the metallic reflective layer not take place. The durability or dimensional stability of the disk depends largely on the modulus of the polymer substrate. Finally, suitable resins for use as a substrate material should have sufficient tensile strength to be usefully employed as a molding resin in compression or injection molding applications.

In U.S. Pat. No. 4,785,053 an optical material having reduced birefringence comprising at least two constituent units each having positive and negative main polarizability differences of at least $50 \times 10^{-25}$ cm$^3$ in terms of absolute values and good water absorbance, heat resistance and moldability is disclosed. At col. 5, lines 45-47, the reference taught that copolymers of styrene and methylmethacrylate possess reduced birefringence. It has now been discovered that this teaching of the reference is incorrect due to reliance by the inventors on previously published values of polarizability for methylmethacrylate containing polymers (which were based on solution measurements of polymethylmethacrylate polarizability). Such solution measurements are not reliable for use in the prediction of ultimate polarizability of copolymeric species. Instead, measurements of molten polymer main polarizability must be employed. For example, the present inventors have now discovered that polymethylmethacrylate possesses a negative, not a positive polarizability value, when measured in a polymer melt. Since polystyrene also has a negative polarizability value, no ratio of styrene and methylmethacrylate monomers will result in reduction of the birefringence of the copolymer compared to polymethylmethacrylate. Contrary to the prediction of U.S. Pat. No. 4,785,053, such polymers comprising styrene and methacrylate esters do not possess reduced birefringence in the absence of a comonomer possessing positive homopolymer polarizability.

The reference also disclosed certain interpolymers of 45 parts by weight methylmethacrylate, 22 parts by weight styrene and 33 parts by weight n-butyl maleimide. Such polymers do hold a potential for reduced birefringence due to the presence of the n-butyl maleimide moiety which has a positive stress optic coefficient. Despite this fact, such copolymers are still unacceptable for use as high performance optical disk substrates. One defect in such copolymers is a still unacceptably high water absorption. Another defect is low strength properties of the resin.

Thus there remains a need to provide copolymers having zero or reduced birefringence in a predictable manner.

There also remains a need to provide a new polymer for use where a combination of good optical properties and strength properties are desired.

More particularly, it would be desirable to provide a polymer able to provide molded objects having reduced birefringence, easy moldability, low water absorption and high tensile strength and modulus properties.

Finally, it would be desirable to provide optical devices such as a substrates used in the preparation of optical disks, lenses, instrument cases and covers, etc., comprising the above copolymer.

SUMMARY OF THE INVENTION

It has now been discovered that birefringence may be predicted for any polymer by measurement of the stress optic coefficient (C) in a melt of such polymer. Moreover, it has now been discovered that the ultimate stress optic coefficient of an interpolymer may be predicted based on the sum of the stress optic coefficients of melts of homopolymers or theoretical homopolymers of the monomers making up the various structural units of such interpolymers. The stress optic coefficient for any polymer may be either positive or negative depending on the direction of rotation imparted to a polarized light beam by the polymer, the stress optic coefficient can be calculated from the initial slope of a graph of true stress versus birefringence for any given polymer. Such a technique is provided by ASTM 4093. Theoretical homopolymer stress optic coefficients may be determined for certain monomers that are incapable of forming homopolymers by linear extrapolation from measured values in the melt of copolymers with varying amounts of the monomer of interest. Examples of the foregoing monomers are the various glutarimides which are derived from methacrylate or methacrylamide polymers and cannot be practically prepared with 100 percent conversion of the precursor moieties.

By determining each monomer's contribution to birefringence in the final polymer, the molar quantity of such monomer may be adjusted to provide polymers possessing intrinsically low birefringence due to the types and proportions of structural units therein. A suitable molding polymer may be designed with monomer components that cancel the individual stress optic coefficients of other monomer components.

According to the present invention there is now provided a polymer having a melt stress optic coefficient that is greater than or equal to −1000 Brewsters and less than or equal to +1000 Brewsters, a glass transition temperature of at least 140° C., and a water absorption ($A_{H2O}$) according to ASTM D570-81 of 0.25 percent or less and comprising structural units a) and b) wherein structural units a) have positive molten homopolymer stress optic coefficients and structural units b) have negative molten homopolymer stress optic coefficients. In a preferred embodiment the polymers of the present invention also possess tensile strength at break as measured by ASTM D-638 of at least 3000 lb/in$^2$ (20 MPa), preferably 4,000 lb/in$^2$ (27 MPa). Further preferred are polymers having a modulus as measured by ASTM D-638 of at least 290,000 lb/in$^2$ (2000 MPa).

In a further embodiment, there is provided an optical storage disk comprising a polymeric substrate wherein such substrate comprises a polymer having a stress optic coefficient in the melt that is greater that or equal to −1000 Brewsters and less than or equal to +1000 Brewsters, a glass transition temperature of at least 140° C., and a water absorption ($A_{H2O}$) according to ASTM D570-81 of 0.25 percent or less and comprising structural units a) and b) wherein structural units a) have positive molten homopolymer stress optic coefficients and structural units b) have negative molten homopolymer stress optic coefficients.

BRIEF DESCRIPTION OF THE DRAWINGS

FIG. 1 is a graph of various properties of a polymer containing in polymerized form styrene, cyclohexylmethacrylate and N-phenyl maleimide. Depicted are regions of polymer composition having a glass transition temperature (Tg)=140° C. (L1) and higher, water absorption ($A_{H2O}$)=0.25 percent (L2) and lower, and Melt Stress Optic Coefficient (C) between +1000 Brewsters (L3) and −1000 Brewsters (L4). It is apparent from the drawing that all polymers of the invention are limited by water absorption before excessive positive Melt Stress Optic Coefficients are reached. Accordingly, a representative polymer of the present invention has a composition within the region of the graph bounded by L1, L2, L4, and the perimeter of the graph.

FIG. 5 is a graph of various properties of a polymer containing in polymerized form styrene, isobutylmethacrylate, and N-cyclohexyl-2,4-dimethylglutarimide. Regions of polymer composition having a glass transition temperature (Tg)=140° C. (L9) and higher water absorption =0.25 percent (L10) and lower, and Melt Stress Optic Coefficient (C) greater than −1000 Brewsters (L12) are depicted. All polymers are limited by water absorption (L10) prior to reaching an excessive positive Melt Stress Optic Coefficient of +1000 Brewsters (L11). Accordingly a representative polymer of the present invention has a composition within the region bounded by L9, L10, L12 and the perimeter of the graph.

FIG. 7 is a graph of various properties of a polymer containing in polymerized form styrene, cyclohexylmethacrylate and N-cyclohexyl-2,4-dimethyl glutarimide. Depicted are regions of polymer composition having a glass transition temperature (Tg) =140° C. (L13) and higher, water absorption ($A_{H2O}$)=0.25 percent (L14) and lower, and Melt Stress Optic Coefficient (C) between +1000 Brewsters (L15) and −1000 Brewsters (L16). It is apparent from the drawing that most polymers of the invention are limited by water absorption before excessive positive Melt Stress Optic Coefficients are reached. A representative polymer of the present invention has a composition within the region of the graph bounded by L13, L14, L15, L16, and the perimeter of the graph.

FIG. 9 is a graph of various properties of a polymer containing in polymerized form styrene, isobutylmethacrylate, and N-methyl-2,4-dimethyl glutarimide. Regions of polymer composition having a glass transition temperature (Tg)=140° C. (L21) and higher, water absorption ($A_{H2O}$)=0.25 percent (L22) and lower, and Melt Stress Optic Coefficient (C) greater than −1000 Brewsters (L24) are depicted. All polymers are limited by water absorption (L22) prior to reaching excessive positive Melt Stress Optic Coefficient of +1000 Brewsters (L23). Accordingly a representative polymer of the present invention has a composition within the region bounded by L21, L22, L24 and the perimeter of the graph.

FIG. 10 is a graph of various properties of a polymer containing in polymerized form styrene, isobutylmethacrylate, and 2,4-dimethyl glutarimide. Regions of polymer composition having a glass transition temperature (Tg)=140° C. (L25) and higher, water absorption ($A_{H2O}$)=0.25 percent (L26) and lower, and Melt Stress Optic Coefficient (C) greater than −1000 Brewsters (L28) are depicted. All polymers are limited by water absorption (L26) prior to reaching an excessive positive Melt Stress Optic Coefficient of +1000 Brewsters (L27). Accordingly a representative polymer of the present invention has a composition within the region bounded by L25, L26, L28 and the perimeter of the graph.

DETAILED DESCRIPTION OF THE INVENTION

Figure 5:
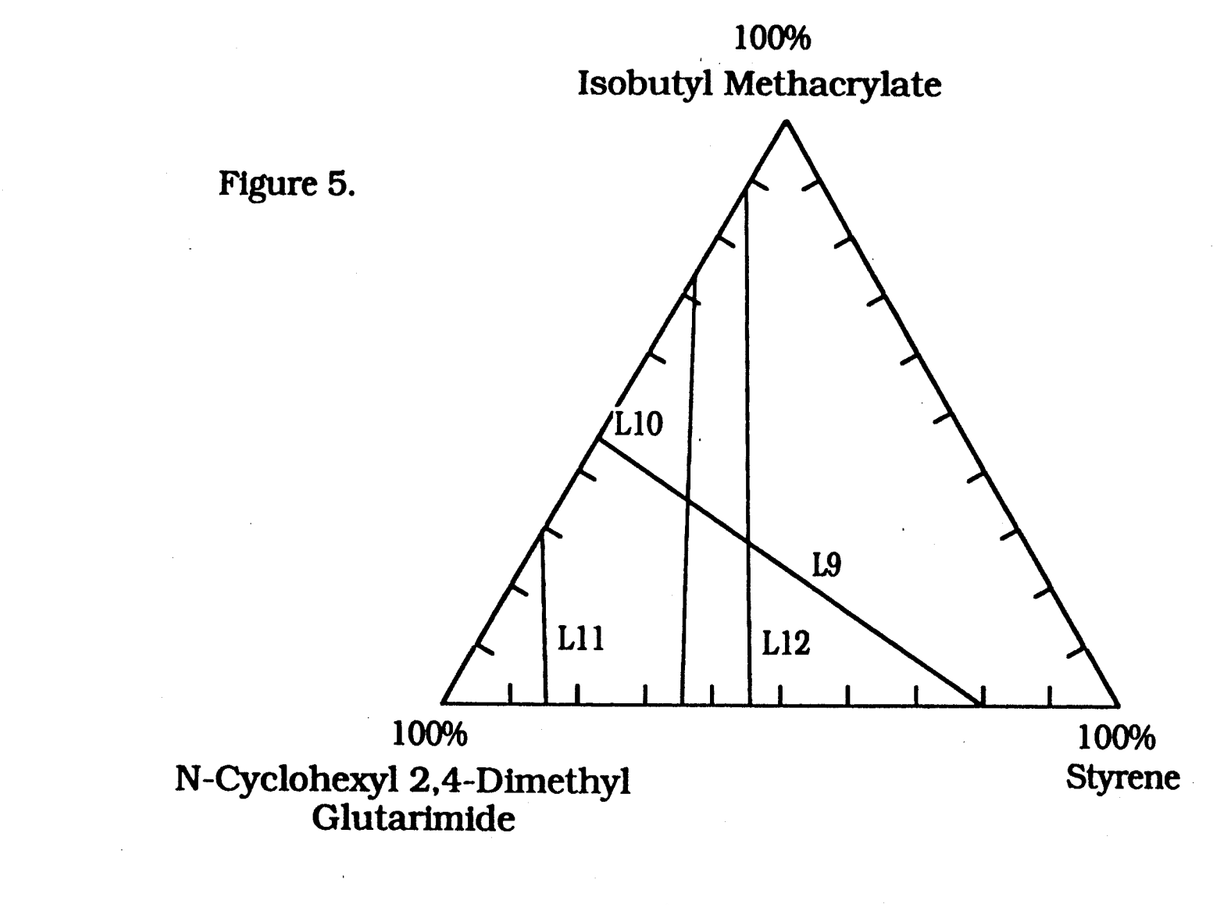
Figure 6:
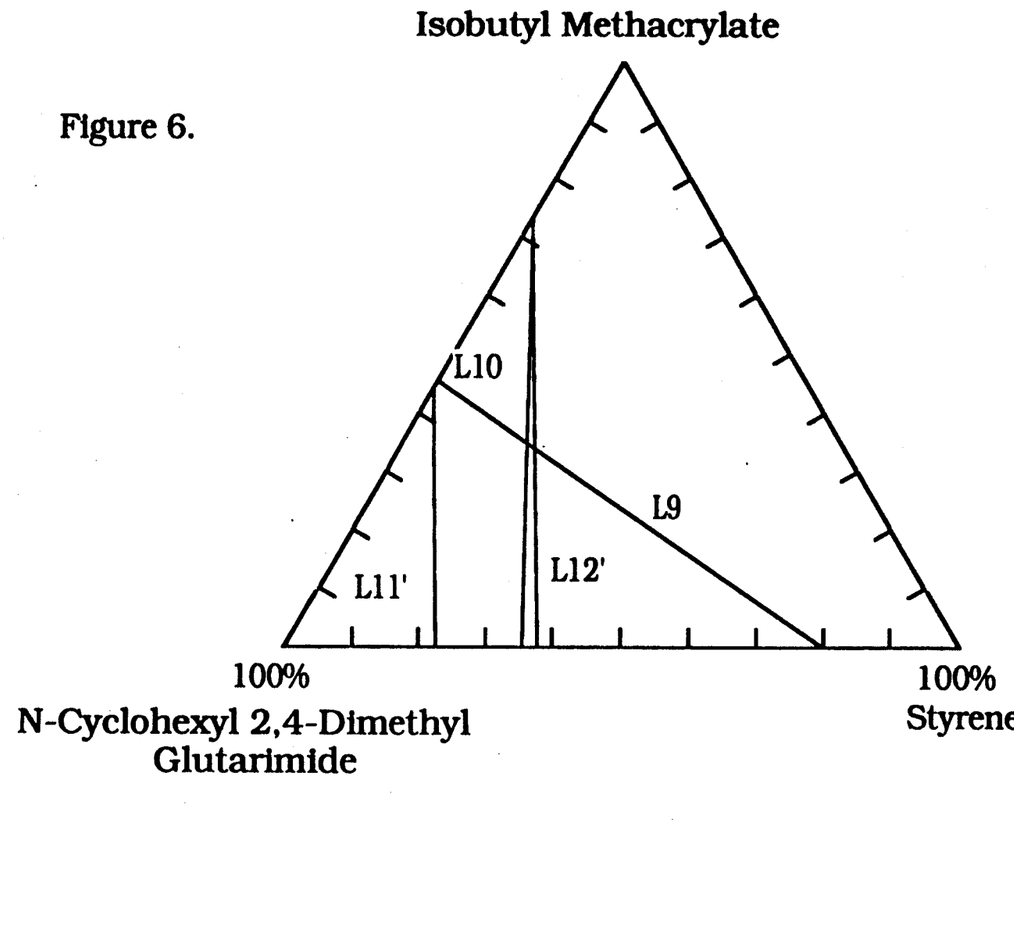
FIG. 6 is a similar graph of the same monomer components as in FIG. 5, excepting that the Melt Stress Optic Coefficients of +500 Brewsters ($L_{11}'$) and −500 Brewsters ($L_{12}'$) are provided. The invented polymers lie in the region bounded by L9, L10, L12' and the perimeter of the graph.

Melt stress optic coefficients (also referred to as molten stress optic coefficients) are utilized by the present inventors instead of polarizability differences to provide a more accurate prediction of the resulting polymer's birefringent properties. The homopolymer melt stress optic coefficient value is calculated based on measurements made from the polymer melt, if available, otherwise it is extrapolated from the calculated melt stress optic coefficients of two or more copolymers with varying ratios of each comonomer. It is required that polymers according to the invention satisfy all of the limitations of melt stress optic coefficient, water absorption and heat distortion. Accordingly, some compositions may be excluded by one property and fail to reach the extremes of another property. For example, the compositions of FIGS. 5 and 6 are limited by water absorption properties before reaching a maximum positive melt stress optic coefficient.

Illustrative of the structural units belonging to group a) are moieties formed by the polymerization of inertly N-substituted maleimides, particularly the alkyl, cycloalkyl, aryl and alkaryl N-substituted maleimides and alkyl, cycloalkyl, aryl and alkaryl ring substituted derivatives thereof having up to about 12 carbons in each substituent group. Also included are structural units derived from glutarimide and inertly substituted glutarimides, especially N-substituted glutarimides such as alkyl, cycloalkyl, aryl, and alkaryl N-substituted glutarimides and alkyl, cycloalkyl, aryl and alkaryl ring substituted derivatives thereof. Such structural units may be depicted by Formula I for the maleimides and Formula II for the glutarimides:

Formula I

Formula II wherein $R_1$ and $R_2$ are independently selected from the group consisting of hydrogen, $C_1$ to $C_{12}$ alkyl, $C_6$ to $C_{12}$ cycloalkyl or aryl, and $C_7$ to $C_{12}$ alkaryl groups; $R_3$ is hydrogen, a $C_1$ to $C_{12}$ alkyl, a $C_6$ to $C_{12}$ cycloalkyl or aryl, or a $C_7$ to $C_{12}$ alkaryl group. Preferably in the Formula I structural units $R_1$ and $R_2$ are both hydrogen. Preferably in the Formula II structural units $R_1$ and $R_2$ are both methyl.

The glutarimide containing polymers may be prepared by any suitable technique. One process involves copolymerization of suitable acrylate or methylacrylate ester containing monomers with copolymerizable monovinylidene aromatic comonomers. Glutarimide functionality is introduced by conversion of adjoining acrylate or methacrylate functionality of a precursor polymer through an aminolysis and glutarimidization reaction. The two step process involves reaction of methacrylic or acrylic groups with an amine and subsequent elimination of a hydroxylated species. Suitable techniques for the introduction of glutarimide functionality into such polymers was previously taught in U.S. Pat. Nos. 3,244,679; 3,284,425; 4,246,374; and Japanese Laid Open Application 85-233,106, all of the teachings of the foregoing being incorporated in their entirety herein by reference thereto. If the glutarimide is formed by heating in the presence of an amine, an N-substituted glutarimide may be prepared. Such N-substituted glutarimides possess reduced hydroscopicity. Alternatively, amide functionality may be first introduced into the polymers via standard copolymerization of e.g. methacrylamide or other suitable monomer and an acrylic or methacrylic acid or derivative thereof, and the resulting polymer glutarimidized, usually by merely heating the polymer.

Maleimide containing polymers may be prepared by a post imidization of maleic anhydride containing polymers or by the direct polymerization of the appropriate monomers.

A particularly desirable group a) structural unit is N-methyldimethylglutarimide. A homopolymer thereof has been calculated to possess a positive molten stress optic coefficient of approximately 3,600±200 Brewsters.

Group b) structural units include moieties derived from monovinylidene aromatic monomers having from 6 to 20 carbons in the aromatic group, as well as structural units derived from alkyl, cycloalkyl, aryl and aralkyl esters of acrylic and methacrylic acids having from 2 to 14 carbons in the alkyl group, from 6 to 14 carbons in the cycloalkyl or aryl groups and from 7 to 14 carbons in the aralkyl group. Preferred group b) structural units are the polymerized form of styrene and of alkyl-, aryl-, alkaryl- or cycloalkylmeth-acrylates. Highly preferred group b) structural units are the polymerized form of styrene and alkyl, cycloalkyl, aryl and aralkyl esters of methacrylic acid having from 2 to 14 carbons in the alkyl group, from 6 to 14 carbons in the cycloalkyl or aryl groups or from 7 to 14 carbons in the aralkyl group (hereinafter referred to as "higher methacrylate esters"), due to the relatively low water absorption attributable thereto.

In the preferred embodiment of the invention at least some quantity of a monovinylidene aromatic monomer is desired since the monovinylidene aromatic monomer imparts good molding properties to the resulting polymer. In particular, polymer melt processability and thermal stability are improved by the presence of at least 5 mole percent, preferably at least 8 mole percent monovinylidene aromatic monomer. In addition it should be understood that compositions having extremely low levels of methacrylate ester cannot be prepared by the preferred technique of amination/cycloglutarimidization disclosed herein, due to the isolation of single methacrylate ester moieties between monovinylidene aromatic monomer moieties rendering the same unavailable for cycloglutarimidization. As a practical limit the acrylate or methacrylate ester content of the polymers of the present invention must be at least 5, preferably at least 8 mole percent. These constraints lead to exclusions, or forbidden zones, in polymeric regions from the areas depicted in the accompanying figures.

Most highly preferred polymers comprise styrene; a methacrylate ester selected from the group consisting of isopropylmethacrylate, isobutylmethacrylate, neopentylmethaorylate, cyclohexylmethacrylate, phenylmethacrylate, and benzylmethacrylate; and 2,4-dimethylglutarimide or $C_{1-6}$ alkyl- or cyclohexyl N-substituted 2,4-dimethylglutarimide groups.

Any number of different group a) and b) moieties may be incorporated into the polymers of the present invention in order to achieve desirable polymer properties. One or more than one of each of the group a) and b) moieties may be employed such that the resulting copolymer or interpolymer possesses the desired molten stress optic coefficient, water absorption, or glass transition temperature. The polymers may be in the block or random polymer form, or graft copolymer form although random copolymers are preferred since large regions or domains in the polymer, such as might occur in certain large domain block copolymers, may affect the polymer's optical properties.

The contribution to the final molten stress optic coefficient of the copolymer of the present invention attributable to a particular moiety is directly proportional to the molar concentration or molar fraction of such moiety. Thus, the stress optic coefficient of the copolymer is the sum of the molar content of each moiety multiplied by the stress optic coefficient of a homopolymer of such moiety (i.e., the homopolymer molten stress optic coefficient). This may be expressed mathematically as:

$$C_t = \Sigma M_m C_m$$

wherein $C_t$ is the total molten stress optic coefficient of the resulting copolymer, $M_m$ is the molar fraction of an individual structural unit m, and $C_m$ is the homopolymer molten stress optic coefficient of structural unit m.

In a preferred embodiment the present invention may be depicted as comprising interpolymerized units corresponding to the following diagram:

wherein x, y and z are the respective molar fractions of such components, R independently each occurrence is $C_2$ to $C_{14}$ alkyl, $C_6$ to $C_{14}$ cycloalkyl or aryl, or $C_7$–$C_{14}$ aralkyl, Ar is $C_6$ to $C_{14}$ aryl, or alkyl- or halo-substituted aryl, $R_1$, $R_2$ and $R_3$ are as previously defined, $R_4$ and $R'$ independently are hydrogen or methyl, and n is zero or one depending on whether maleimide or glutarimide functionality is present. In a highly preferred embodiment, the polymer comprises glutarimide and methacrylate ester functionality (i.e. n=1 and $R'$ is methyl).

The relative amounts of moieties in the above described polymeric formula (x, y, and z) for preferred and most preferred compositions may be determined by reference to FIGS. 1–10 wherein polymeric compositions within the defined regions will achieve the desired polymer properties. The values of x, y, and z are obtained from the corresponding maxima and minima of each component in such figures, taking into consideration forbidden zones as previously explained.

Figure 1:
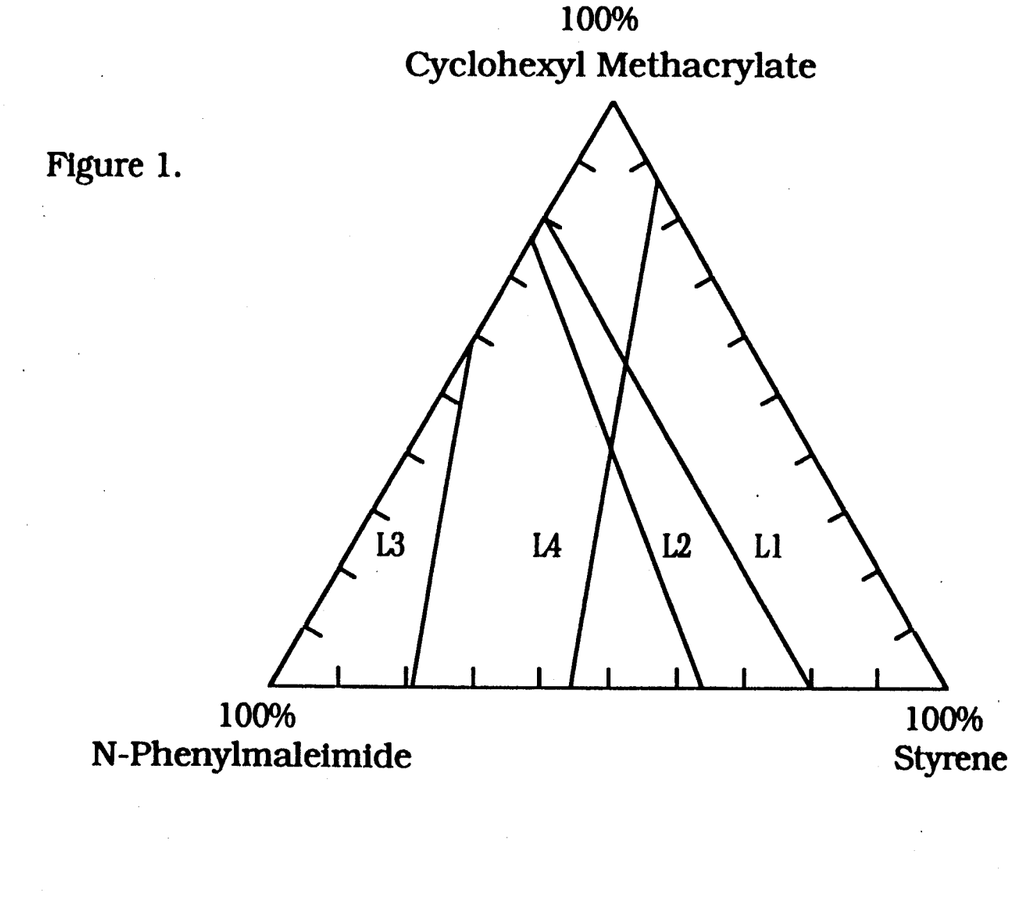
Figure 2:
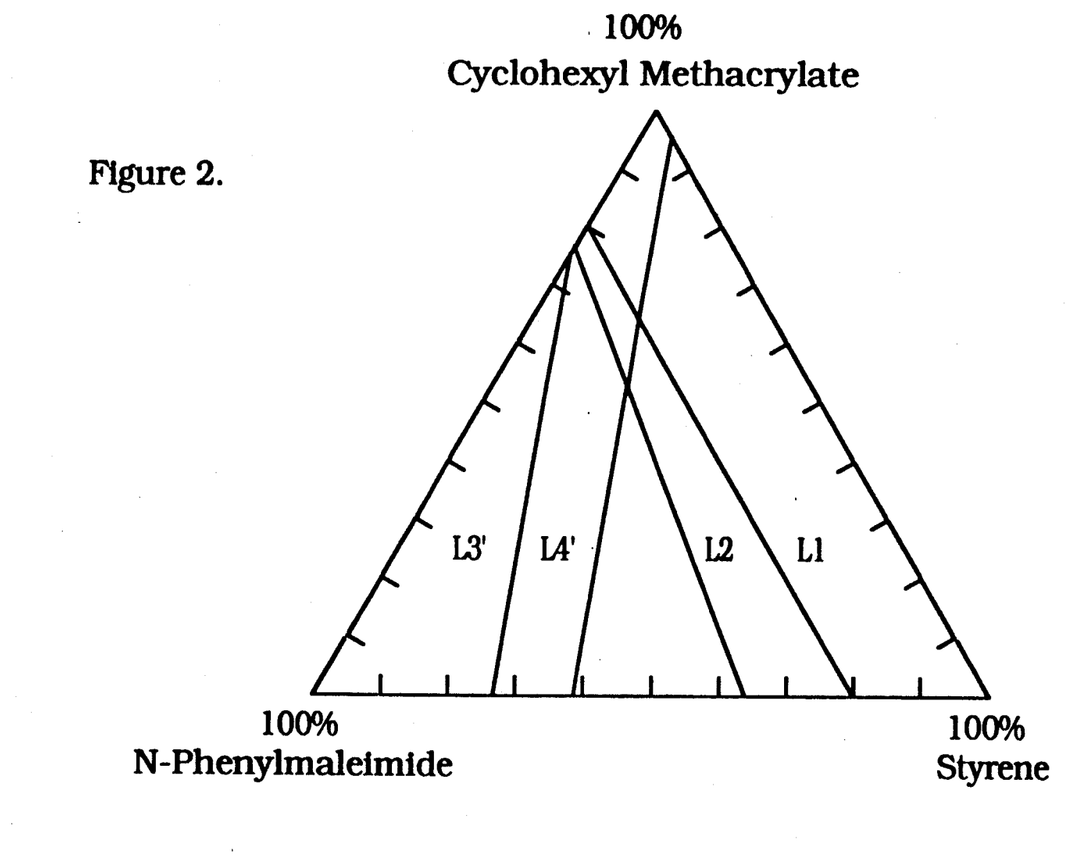
FIG. 2 is a similar graph of the same monomer components as in FIG. 1, excepting that the Melt Stress Optic Coefficients of +500 Brewsters (L3') and −500 Brewsters (L4') are depicted. A representative preferred polymer of the present invention has a composition within the region of the graph bounded by L1, L2, L4', and the perimeter of the graph.

Thus for the specific terpolymer of styrene, cyclohexylmethacrylate and N-phenylmaleimide (FIGS. 1 and 2) preferably:

x ranges from 0.05 to 0.30 (5 to 30 mole percent), most preferably from 0.08 to 0.20 (8 to 20 mole percent):

y ranges from 0.40 to 0.80 (40 to 80 mole percent), most preferably from 0.55 to 0.80 (55 to 80 mole percent): and z ranges from 0.20 to 0.30 (20 to 30 mole percent), most preferably from 0.20 to 0.30 (20 to 30 mole percent).

Figure 3:
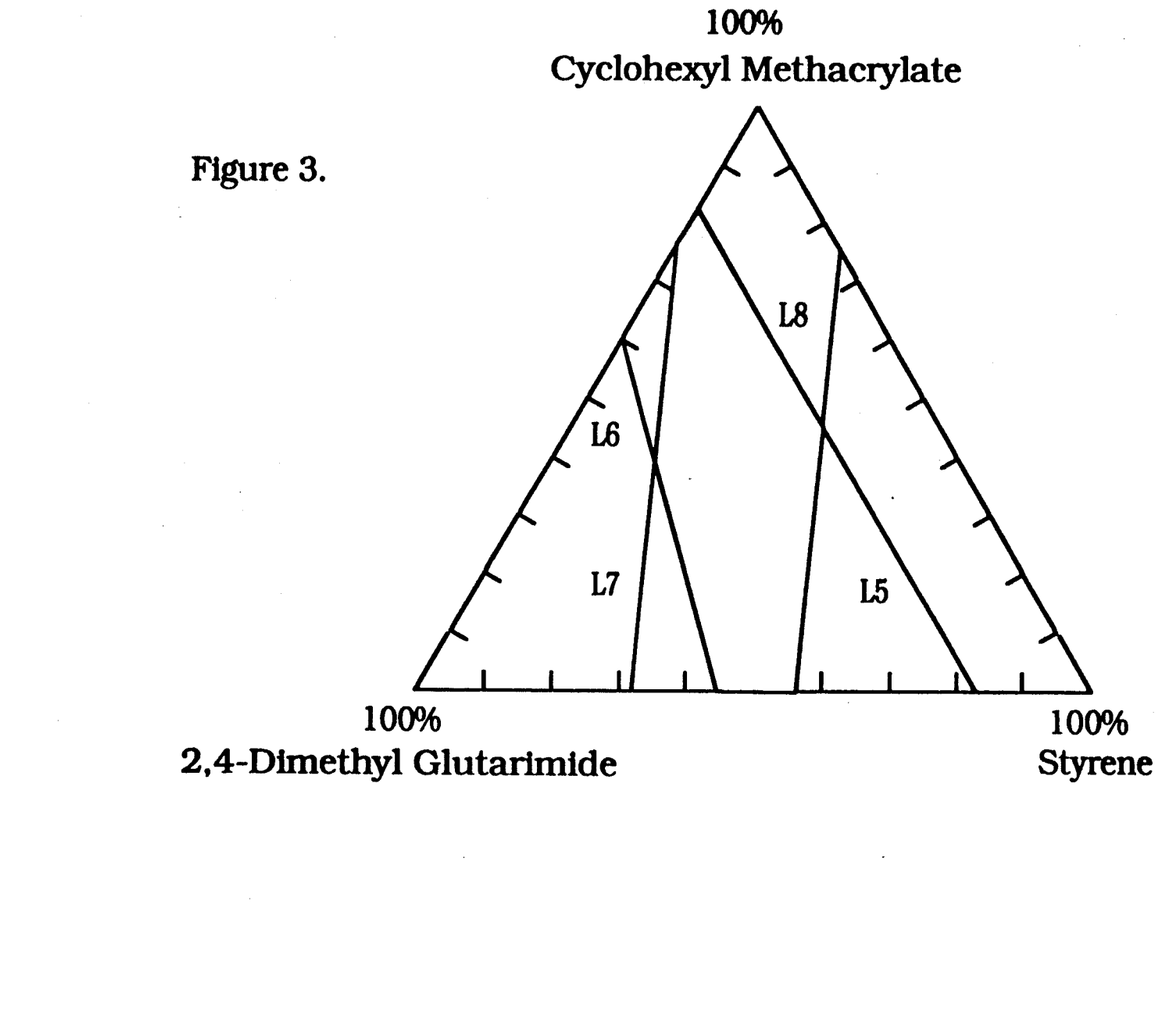
FIG. 3 is a graph of various properties of a polymer containing in polymerized form styrene, cyclohexylmethacrylate, and 2,4-dimethylglutarimide. Regions of polymer composition having a glass transition temperature (Tg)=140° C. (L5) and higher, water absorption ($A_{H2O}$)=0.25 percent (L6) and lower, and Melt Stress Optic Coefficient (C) between +1000 Brewsters (L7) and −1000 Brewsters (L8) are depicted. Accordingly a representative polymer of the present invention has a composition within the region bounded by L5, L6, L7, L8, and the perimeter of the graph.
Figure 4:
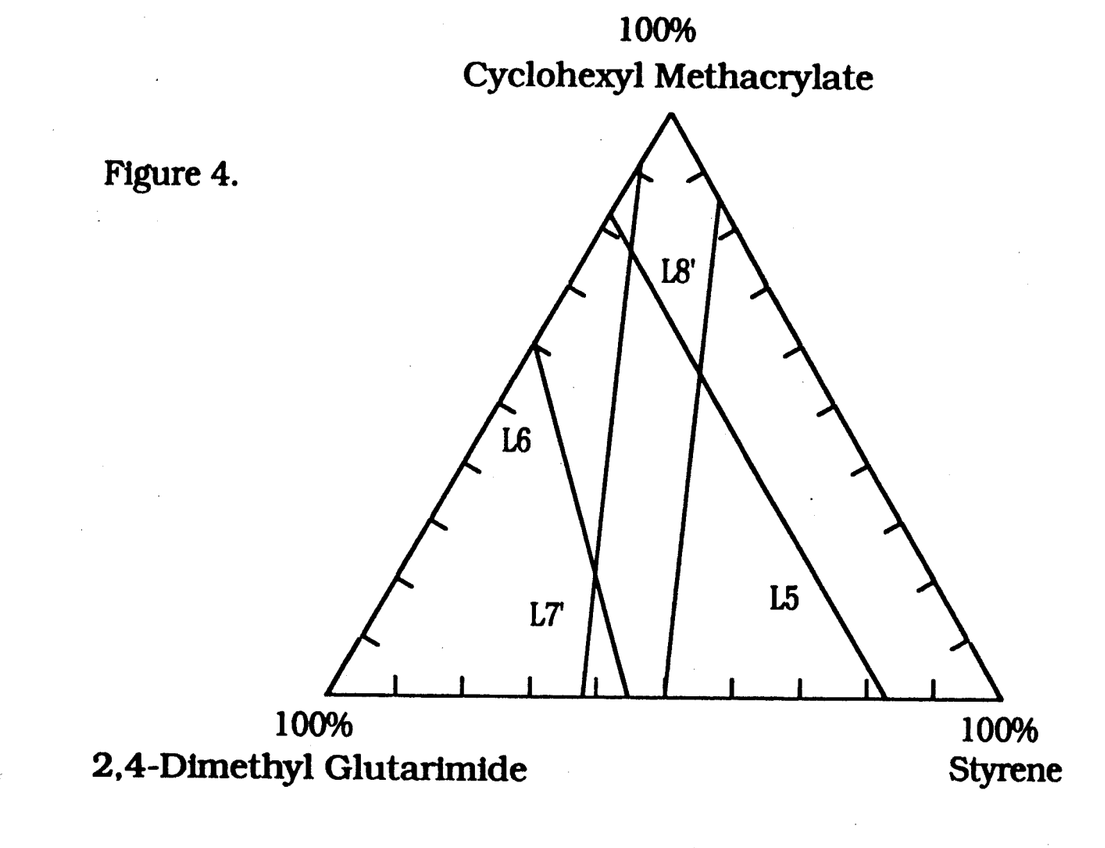
FIG. 4 is a similar graph of the same monomer components as in FIG. 3, excepting that the Melt Stress Optic Coefficients are between +500 Brewsters (L7') and −500 Brewsters (L8'). A representative preferred polymer of the present invention has a composition within the region of the graph bounded by L5, L6, L7', L8' and the perimeter of the graph.

For terpolymers of styrene, cyclohexylmethacrylate and 2,4-dimethylglutarimide (FIGS. 3 and 4) preferably:

x ranges from 0.05 to 0.55 (5 to 55 mole percent), most preferably from 0.08 to 0.50 (8 to 50 mole percent):

y ranges from 0.05 to 0.85 (5 to 85 mole percent), most preferably from 0.08 to 0.77 (8 to 77 mole percent): and z ranges from 0.15 to 0.55 (15 to 55 mole percent), most preferably from 0.15 to 0.55 (15 to 55 mole percent).

For terpolymers of styrene, isobutylmethacrylate and N-cyclohexyl-2,4-dimethylglutarimide (FIGS. 5 and 6) preferably:

x ranges from 0.20 to 0.43 (20 to 43 mole percent), most preferably from 0.20 to 0.35 (20 to 35 mole percent):

y ranges from 0.05 to 0.33 (5 to 33 mole percent), most preferably from 0.08 to 0.33 (8 to 33 mole percent); and z ranges from 0.42 to 0.62 (42 to 62 mole percent), most preferably from 0.46 to 0.60 (46 to 60 mole percent).

Figure 7:
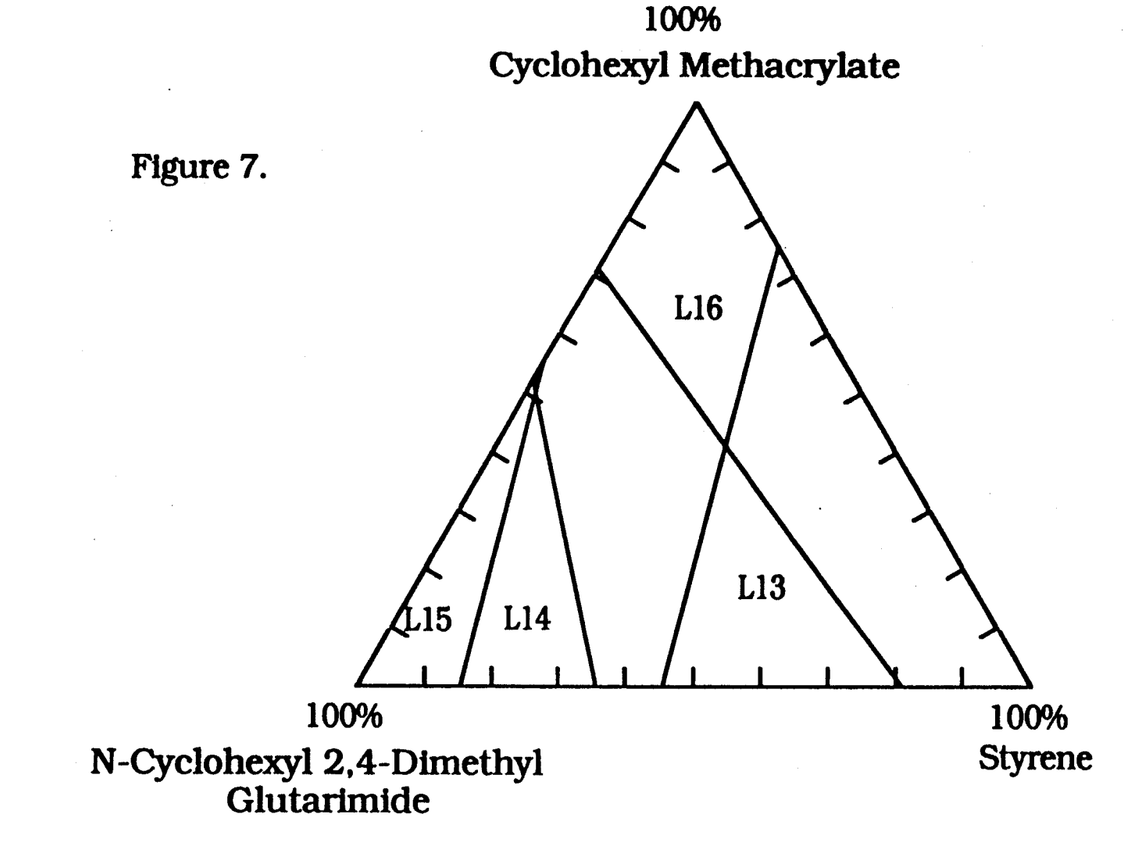

For terpolymers of styrene, cyclohexylmethacrylate and N-cyclohexyl-2,4-dimethylglutarimide (FIG. 7) preferably:

x ranges from 0.05 to 0.43 (5 to 43 mole percent):

y ranges from 0.05 to 0.68 (5 to 68 mole percent): and z ranges from 0.25 to 0.62 (25 to 62 mole percent).

Figure 8:
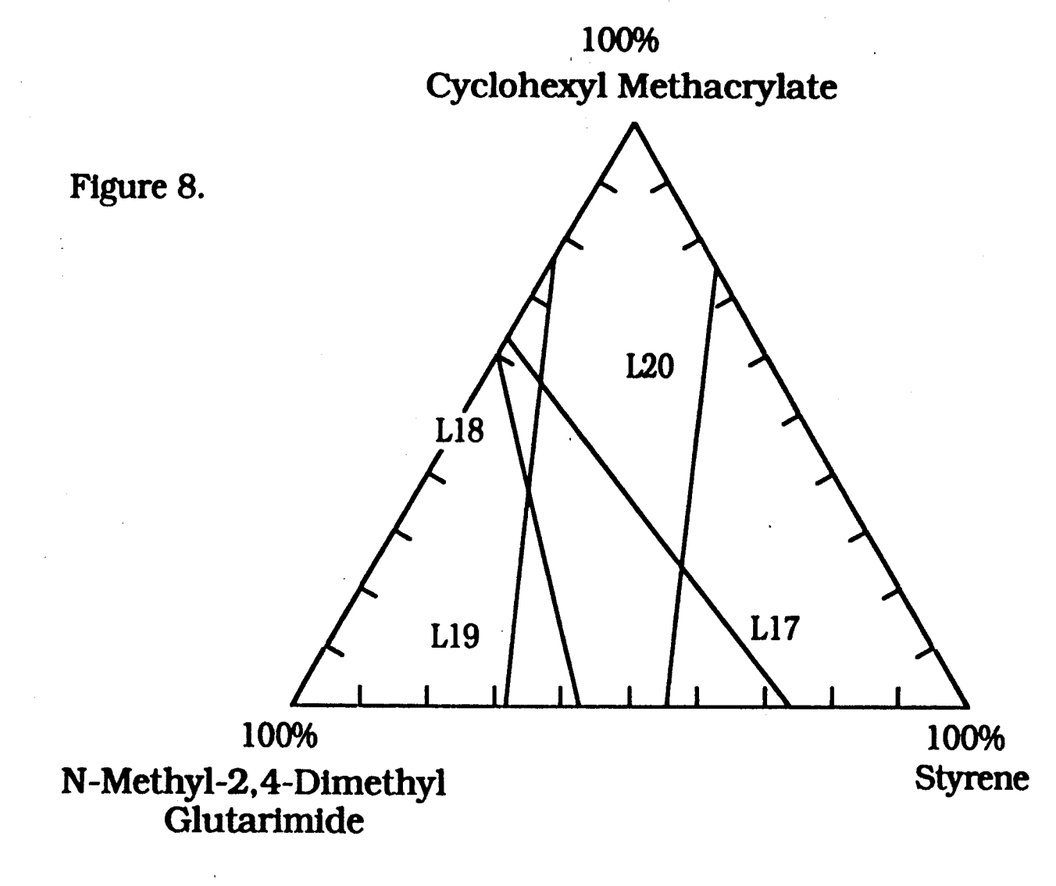
FIG. 8 is a graph of various properties of a polymer containing in polymerized form styrene, cyclohexylmethacrylate and N-methyl-2,4-dimethyl glutarimide. Depicted are regions of polymer composition having a glass transition temperature (Tg) =140° C. (L17) and higher, water absorption ($A_{H2O}$)=0.25 percent (L18) and lower, and Melt Stress Optic Coefficient (C) between +1000 Brewsters (L19) and −1000 Brewsters (L20). A representative polymer of the present invention has a composition within the region of the graph bounded by L17, L18, L19, L20, and the perimeter of the graph.

For terpolymers of styrene, cyclohexylmethacrylate and N-methyl-2,4-dimethylglutarimide (FIG. 8) preferably:

x ranges from 0.09 to 0.54 (9 to 54 mole percent):

y ranges from 0.05 to 0.55 (5 to 55 mole percent): and z ranges from 0.30 to 0.55 (30 to 55 mole percent).

Figure 9:
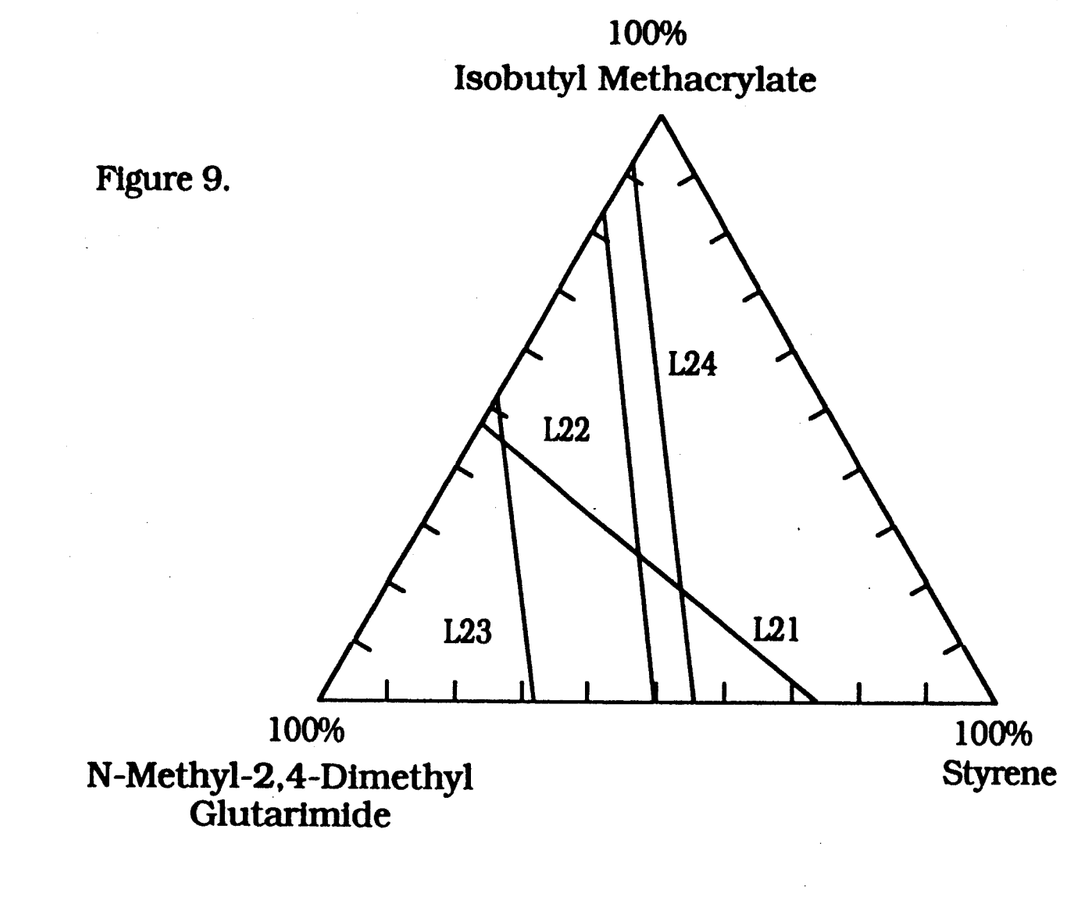

For terpolymers of styrene, isobutylmethacrylate and N-methyl-2,4-dimethylglutarimide (FIG. 9) preferably:

x ranges from 0.35 to 0.53 (35 to 53 mole percent):

y ranges from 0.05 to 0.25 (5 to 25 mole percent): and z ranges from 0.37 to 0.48 (37 to 48 mole percent).

Figure 10:
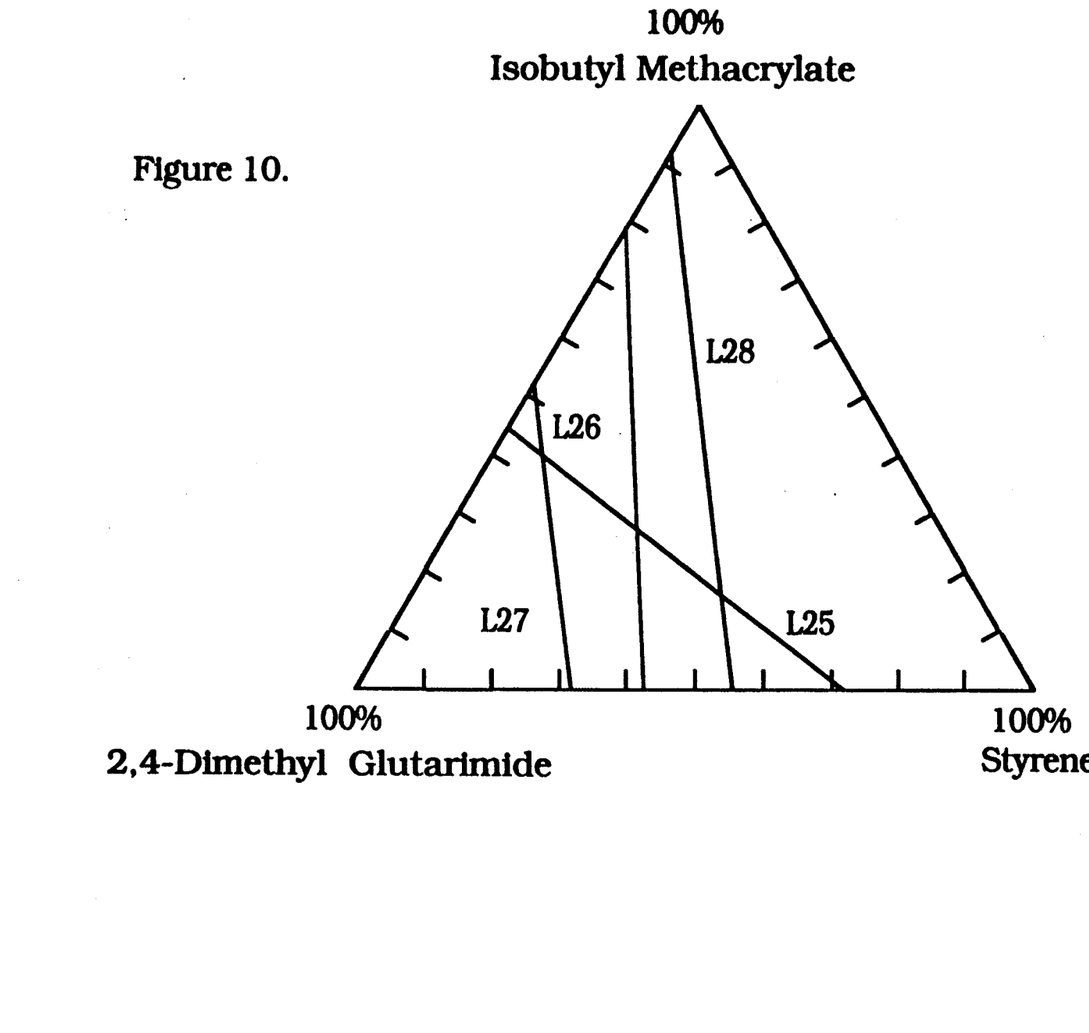

For terpolymers of styrene, isobutylmethacrylate and 2,4-dimethylglutarimide (FIG. 10) preferably:

x ranges from 0.38 to 0.55 (38 to 55 mole percent);

y ranges from 0.05 to 0.27 (5 to 27 mole percent): and z ranges from 0.28 to 0.54 (28 to 54 mole percent).

In the preparation of the invented polymers there is preferably first formed a copolymer of one or more vinylaromatic monomers, methylmethacrylate and one or more higher methacrylate esters containing sufficient amounts of methylmethacrylate to result in adjacent methylmethacrylate-higher methacrylate ester pairs which may be converted to glutarimide moieties by the previously mentioned technique of glutarimidization. It has been discovered by the present inventors that higher methacrylate esters do not undergo aminolysis (the first step of the glutarimidization process) under practical reaction conditions. However when methylmethacrylate moieties are adjacent to the higher methacrylate ester moieties, the methylmethacrylate moiety undergoes aminolysis and then the adjacent pairs will cycloimidize. The degree of conversion of higher methacrylate ester functionality to glutarimide functionality may be controlled so as to attain a relatively low methylmethacrylate residual functionality which is necessary to achieve the reduced water absorption properties required of the present invention.

An alternative process to the above described aminolysis and imidization procedure for preparing glutarimide containing polymers is the technique of copolymerization and glutarimidization. A methacrylamide containing copolymer is initially prepared by free radical copolymerization. This polymer is readily converted into a glutarimide moiety by heating the resulting polymer. Preferably the imidization processes herein are conducted at temperatures of 100° C. to 300° C. under reduced pressure.

Preferred residual methylmethacrylate or methacrylamide content of the polymers is less than 2.0 mole percent, more preferably less than 1.0 mole percent, most preferably less than 0.5 mole percent. $^{13}$C NMR Analysis may be used to detect residual levels of methylmethacrylate or methacrylamide. Maleimide containing polymers may be prepared by direct free radical polymerization of the respective monomers as is well known in the art.

Highly preferred polymers according to the invention are those having a molten stress optic coefficient greater than or equal to −500 Brewsters but less than or equal to +500 Brewsters. In measuring such values, an accuracy of ±200 Brewsters is normally expected.

Glass transition temperatures of the polymers are preferably at least about 145° C. These values are determined on a DuPont 1090 Thermo-analyzer at a heating rate of 20° C./min at the inflection point. Water absorption values are determined after 24 hours immersion at 23° C. In the attached drawings all of the lines are linear models representing the theoretical variation of polymer properties as a function of polymer composition. Actual polymer properties conform to such a linear approximation quite closely. As a general rule a deviation of actual physical properties from the theoretical predicted values up to ±5 percent may be expected.

Having described the invention the following examples are provided as further illustrative and are not to be construed as limiting. Throughout the specification, including the examples, parts and percentages are based on weight unless stated to the contrary.

EXAMPLE 1

A 2,4-dimethylglutarimide, styrene, and cyclohexyl methacrylate containing polymer was prepared by the techniques of copolymerization and glutarimidization. Accordingly an interpolymer of styrene, cyclohexyl methacrylate, and methacrylamide was prepared. In a 1.5 liter, glass reactor fitted with inlet tubes, nitrogen pad, and stirrer, styrene 29 g, cyclohexyl methacrylate 225 g, and methacrylamide 122 g, were introduced, along with 50 percent based o monomer weight of N,N-dimethylformamide solvent. 250 ppm of a peroxide initiator 1,1-bis(t-butylperoxy)cyclohexane was introduced and the reactor heated to 80-100° C. with stirring. Reaction was continued only a short time period (10-20 percent conversion) to prevent polymer compositional drift and possible degeneration of optical properties. The polymer was recovered by precipitation in methanol.

Devolatilization and glutarimidization were effected by heating a thin layer of the polymer on a polytetrafluoroethylene coated tray under reduced pressure (4 Torr) at 255° C. for 75 minutes.

The presence of 2,4-dimethylglutarimide functionality was confirmed by thermal gravimetric and mass spectrographic analysis. Definitive chemical structure was assigned by IR spectroscopy, $^{13}$C NMR and $^1$H NMR analysis. In the NMR analysis, samples were prepared in methylene chloride solvent. Peaks of the spectrum attributable to glutarimide functionality were observed by review of comparative spectrums of un-glutarimidized and partially glutarimidied polymers. Compositional analysis was also confirmed by elemental analysis. Molar composition was 24 percent styrene, 57 percent cyclohexyl methacrylate and 19 percent glutarimide. No evidence of residual methacrylamide functionality was detected.

A compression molded plaque (3.2 mm thick) was prepared from the preceding resin and physical properties thereof were tested. Results are contained in Table I.

EXAMPLE 2

A styrene/maleimide/cyclohexylmethacrylate interpolymer was formed by solution polymerization of 3.1 weight percent styrene, 8.0 weight percent maleimide, and 36.5 weight percent cyclohexyl methacrylate in dimethylformamide solvent utilizing a continuous stirred tank reactor of 1.5 liter capacity.

TABLE I

| Tg (°C.) | Melt Stress Optic Coefficient (Brewsters) | $A_{H2O}$ |
|---|---|---|
| 144 | −200 | 0.21 |

Temperature was 100° C. and 1,1-bis(t-butylperoxy)cyclohexane catalyst. The resulting polymer had monomer content in mole percent as determined by $^{13}$C NMR of styrene 17 percent, cyclohexylmethacrylate 60 percent, and maleimide 23 percent.

A compression molded sample (3.2 mm thick) was tested for physical properties. Results are contained in Table II.

TABLE II

| Tg (°C.) | Melt Stress Optic Coefficient (Brewsters) | $A_{H2O}$ |
|---|---|---|
| 142 | −500 | 0.18 |

EXAMPLE 3

A styrene, isobutyl methacrylate and N-cyclohexyl-2,4-dimethylglutarimide copolymer was prepared by the technique of polymer amination/cycloglutarimidization. Accordingly, a prepolymer of styrene, isobutyl methacrylate and methyl methacrylate was synthesized by free radical, solution polymerization techniques employing ethylbenzene solvent and 250 parts per million of a free radical initiator. The polymerization was conducted at a temperature of 100° C. in a jacketed, glass-lined batch reactor equipped with a condenser, mechanical stirrer, nitrogen atmosphere, steam heat and water cooling capability.

The polymerization was allowed to proceed to approximately 50 percent conversion, at which time the reaction was cooled and the prepolymer isolated by precipitation with an excess of methanol. The prepolymer were collected by filtration at reduced pressure and thoroughly devolatilized to remove solvent at 220° C., 4 Torr for approximately 1 hour.

The prepolymer was then dissolved in a mixture of toluene and methanol (90/10 by weight) to a 30 percent solid level. The mixture was then charged to a 300 milliliter batch reactor designed for high temperatures and pressures. The contents of the reactor were thoroughly sparged with nitrogen and evacuated. A stoichiometric amount of cyclohexylamine aminating agent relative to ester content was then pressure-fed to the reactor The reactor was heated to 230° C. The reactor pressure was maintained at about 500 psig (3500 kPa) for approximately 10 hours. Samples were withdrawn for analysis throughout the run. After reaction completion the reactor contents were isolated by precipitation with an excess of hexane and thoroughly devolatilized in a vacuum oven. Product analysis indicated substantially complete conversion of methyl methacrylate and some conversion of isobutylmethacrylate functionality to the resulting N-cyclohexyl-2,4-dimethylglutarimide functionalized polymers. Analysis by NMR spectroscopy for the presence of residual quantities of methyl methacrylate functionality indicated less than 0.001 percent. Resulting polymer properties are contained in Table III.

TABLE III

| Polymer Composition (mole percent) | $T_g$ °C. | C (Brewsters) | $A_{H_2O}$ percent |
|---|---|---|---|
| Styrene (21) Isobutyl methacrylate (29) N-cyclohexyl-2,4-dimethyl-glutarimide (50) | 158 | −630 | 0.25 |

What is claimed is:

1. A polymer comprising:
   a) glutarimide moieties corresponding to the formula:

wherein $R_1$ and $R_2$ are independently selected from the group consisting of hydrogen, $C_1$ to $C_{12}$ alkyl, $C_6$ to $C_{12}$ cycloalkyl or aryl, and $C_7$ to $C_{12}$ alkaryl groups; $R_3$ is hydrogen, a $C_1$ to $C_{12}$ alkyl, a $C_6$ to $C_{12}$ cycloalkyl or aryl, or a $C_7$ to $C_{12}$ alkaryl group; and n is zero or one,
   b) monovinylidene aromatic moieties having from 6 to 20 carbons in the aromatic group, and
   c) higher methacrylate ester moieties wherein the ester group is $C_2$ to $C_{14}$ alkyl, $C_6$ to $C_{14}$ cycloalkyl or aryl, or $C_7$ to $C_{14}$ aralkyl;
   said polymer having less than 2.0 mole percent methyl methacrylate or methacrylamide functionality, and a melt stress optic coefficient (C) that is greater than or equal to −1000 Brewsters and less than or equal to +1000 Brewsters, a glass transition temperature of at least 140° C., and a water absorption ($A_{H_2O}$) according to ASTM D570-81 after 24 hours immersion in water at 23° C. of 0.25 percent or less.

2. A polymer according to claim 1 wherein the higher methacrylate ester is isopropylmethacrylate, isobutylmethacrylate, neopentylmethacrylate, cyclohexylmethacrylate, phenylmethacrylate, or benzylmethacrylate.

3. A polymer according to claim 2 comprising on a molar basis from 5 to 55 percent styrene, from 5 to 85 percent cyclohexylmethacrylate, and from 15 to 55 percent 2,4-dimethylglutarimide functionality.

4. A polymer according to claim 2 comprising on a molar basis from 20 to 43 percent styrene, from 5 to 33 percent isobutylmethacrylate, and from 42 to 62 percent N-cyclohexyl-2,4-dimethylglutarimide functionality.

5. A polymer according to claim 2 comprising on a molar basis from 5 to 43 percent styrene, from 5 to 68 percent cyclohexylmethacrylate, and from 25 to 62 percent N-cyclohexyl-2,4-dimethylglutarimide functionality.

6. A polymer according to claim 2 comprising on a molar basis from 9 to 54 percent styrene, from 5 to 55 percent cyclohexylmethacrylate, and from 30 to 55 percent N-methyl-2,4-dimethylglutarimide functionality.

7. A polymer according to claim 2 comprising on a molar basis from 35 to 53 percent styrene, from 5 to 25 percent isobutylmethacrylate, and from 37 to 48 percent N-methyl-2,4-dimethylglutarimide functionality.

8. A polymer according to claim 8 comprising on a molar basis from 38 to 55 percent styrene, from 5 to 27 percent isobutylmethacrylate, and from 37 to 54 percent 2,4-dimethylglutarimide functionality.

9. A molded thermoplastic article having reduced birefringence comprising a polymer according to claim 1.

* * * * *